United States Patent
Schaude

(10) Patent No.: US 10,983,806 B2
(45) Date of Patent: Apr. 20, 2021

(54) USER INTERFACE FOR COMPUTER SYSTEM USAGE TYPES

(71) Applicant: SAP SE, Walldorf (DE)

(72) Inventor: Horst F. Schaude, Kraichtal (DE)

(73) Assignee: SAP SE, Walldorf (DE)

( * ) Notice: Subject to any disclaimer, the term of this patent is extended or adjusted under 35 U.S.C. 154(b) by 85 days.

(21) Appl. No.: 16/183,577

(22) Filed: Nov. 7, 2018

(65) Prior Publication Data

US 2020/0142716 A1    May 7, 2020

(51) Int. Cl.
  *G06F 3/0482*   (2013.01)
  *G06F 9/451*    (2018.01)
  *G06F 3/0484*   (2013.01)

(52) U.S. Cl.
  CPC .......... *G06F 9/451* (2018.02); *G06F 3/0482* (2013.01); *G06F 3/04847* (2013.01)

(58) Field of Classification Search
  CPC ..... G06F 9/451; G06F 3/0482; G06F 3/04847
  See application file for complete search history.

(56) References Cited

U.S. PATENT DOCUMENTS

| | | | |
|---|---|---|---|
| 9,928,151 B1* | 3/2018 | Rodriguez Valadez | ..................... G06F 11/26 |
| 2013/0097601 A1* | 4/2013 | Podvratnik | ............... G06F 8/61 718/1 |
| 2014/0047081 A1* | 2/2014 | Edwards | ............. H04L 63/0272 709/220 |
| 2014/0047341 A1* | 2/2014 | Breternitz | ............... G06F 9/505 715/735 |
| 2014/0365662 A1* | 12/2014 | Dave | ...................... G06Q 30/02 709/226 |
| 2019/0227828 A1* | 7/2019 | Zhang | ....................... G06F 8/63 |

* cited by examiner

*Primary Examiner* — Dino Kujundzic
(74) *Attorney, Agent, or Firm* — Schwegman Lundberg & Woessner, P.A.

(57) ABSTRACT

Techniques for providing an improved user interface in which a computer system usage type is configured are disclosed. In some embodiments, a computer-implemented method comprises: displaying a first plurality of selectable UI elements indicating distinct system types based on a request to create a new computer system; receiving a first user selection of one of the first plurality of selectable UI elements; displaying a second plurality of selectable UI elements indicating distinct system usage types in response to a determination that the distinct system type indicated by the first user selection comprises a predetermined system type; receiving a second user selection of one of the second plurality of UI elements; creating the new computer system; and storing the distinct system usage type indicated by the second user selection in association with the new computer system in a database.

20 Claims, 13 Drawing Sheets

SYSTEMS

| TENANCE SCHEDULE | SYSTEM AVAILABILITY | SYSTEMS | CONTACT DETAILS |

THIS VIEW GIVES YOU AN OVERVIEW OF YOUR PRODUCTION AND TEST SYSTEMS AND THEIR CURRENT STATUS. YOU CAN SORT SYSTEM INFORMATION, VIEW SYSTEM DETAILS, AND MANAGE YOUR SYSTEMS.

| VIEW | REQUEST CREATION | REQUEST TERMINATION | COPY SOLUTION PROFILE |

ACTIVE SYSTEMS ▽

| STATUS | SYSTEM ID | SYSTEM TYPE | SYSTEM USAGE TYPE | SYSTEM URL |
|---|---|---|---|---|
| RUNNING | 730053540 | PRODUCTION | N/A | H4T-CUST820.DEV.SAPBYDESIGN.COM |
| RUNNING | 730053541 | TEST | FUNCTIONAL TEST | H4T-CUST821.DEV.SAPBYDESIGN.COM |
| RUNNING | 730053544 | TEST | MODULE INTEGRATION TEST | QWF-CUST245.DEV.SAPBYDESIGN.COM |

USER INTERFACE FOR COMPUTER SYSTEM USAGE TYPES

TECHNICAL FIELD

The present application relates generally to the technical field of electrical computer systems, and, in various embodiments, to systems and methods for providing an improved user interface in which a computer system usage type is configured during creation of a new computer system in a computer architecture.

BACKGROUND

In a cloud software solution provided within a cloud computing system architecture, users may use multiple computer systems. These different computer systems can be dedicated for different uses and purposes. However, in creating and managing such a computer system, there is currently no accurate, efficient, and user-friendly way of configuring usage types for these computer systems during their creation. As a result, users and components of the cloud computing system architecture cannot conveniently, quickly, and reliably determine for what use or purpose a computer system is dedicated.

BRIEF DESCRIPTION OF THE DRAWINGS

Some example embodiments of the present disclosure are illustrated by way of example and not limitation in the figures of the accompanying drawings, in which like reference numbers indicate similar elements.

FIGS. 4A-4G illustrate different stages of a user interface in which a computer system usage type is configured during creation of a new computer system, in accordance with some example embodiments.

DETAILED DESCRIPTION

Figure 1:
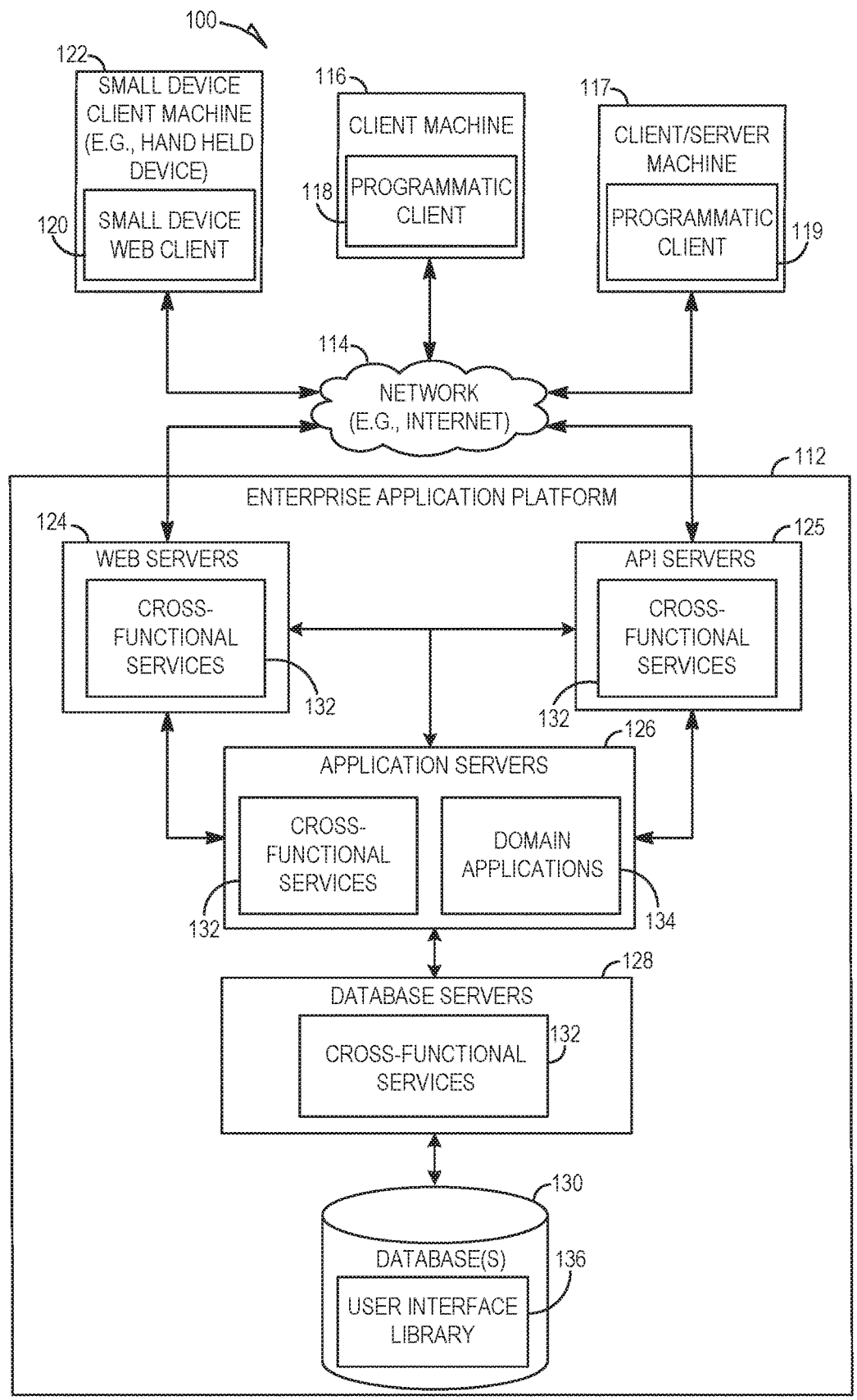
FIG. 1 is a network diagram illustrating a client-server system, in accordance with some example embodiments.

Example methods and systems for providing an improved user interface in which a computer system usage type is configured during creation of a new computer system in a computer architecture are disclosed. In the following description, for purposes of explanation, numerous specific details are set forth in order to provide a thorough understanding of example embodiments. It will be evident, however, to one skilled in the art that the present embodiments can be practiced without these specific details.

In some example embodiments, selectable options for configuring a computer system usage type for a new computer system are accessed in a particular manner using an improved user interface, with a requirement that the user interface and the system generating the user interface be in a particular state during the creation of the new computer system. One technical effect of the system and method of the present disclosure is to provide an improved user interface that enables the effective and efficient use of different types of computer systems for different types of uses. The particular manner in which the selectable options for configuring the computer system usage type for the new computer system are provided improves the accuracy of the resulting configuration, thereby improving the functionality of the overall computer architecture in which the new computer system is implemented. Furthermore, the system and method of the present disclosure provide an accurate, efficient, and user-friendly way of configuring usage types for computer systems during their creation. As a result, users and components of a cloud computing system architecture can conveniently, quickly, and reliably determine for what use or purpose a computer system is dedicated. Additionally, other technical effects that improve the functionality of computer systems will be apparent from this disclosure as well.

In some example embodiments, a computer-implemented method comprises a machine, having a memory and at least one hardware processor, performing operations comprising: detecting a request to create a new computer system in a cloud computing system architecture; causing a first plurality of selectable user interface (UI) elements to be displayed on a first computing device based on the detecting of the request, each one of the first plurality of selectable UI elements indicating a distinct system type; receiving a first user selection of one of the first plurality of selectable UI elements from the first computing device; determining that the distinct system type indicated by the first user selection of the selected one of the first plurality of selectable UI elements comprises a predetermined system type; causing a second plurality of selectable UI elements to be displayed on the first computing device in response to the determination, each one of the second plurality of selectable UI elements indicating a distinct system usage type; receiving a second user selection of one of the second plurality of UI elements from the first computing device; creating the new computer system in the computer architecture; and storing the distinct system usage type indicated by the selected one of the second plurality of UI elements in association with the new computer system in a database.

In some example embodiments, the operations further comprise: receiving a request from a second computing device to view a list of computer systems in the computer architecture; retrieving the distinct system usage type stored in association with the new computer system from the database; and causing the list of computer systems in the computer architecture to be displayed on the second computing device, the retrieved distinct system usage type being displayed in association with the new computer system in the list of computer systems.

In some example embodiments, the predetermined system type comprises a test system for testing one or more aspects of a cloud software solution. In some example embodiments, the distinct system usage types of the second plurality of selectable UI elements comprise different types of tests. In some example embodiments, the different types of tests comprise at least one of a functional test, a module integration test, a system integration test, and a user acceptance test.

In some example embodiments, the first plurality of selectable UI elements comprises a first selectable UI element indicating a production system and second selectable UI element indicating a test system.

In some example embodiments, the second plurality of selectable UI elements are displayed on the first computing device using at least one of a drop-down menu, a scroll bar, selectable buttons, and selectable check boxes.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and advantages of the subject matter described herein will be apparent from the description and drawings, and from the claims.

FIG. 1 is a network diagram illustrating a client-server system 100, in accordance with some example embodiments. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the example enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The cross-functional services 132 can include relational database modules to provide support services for access to the database(s) 130, which includes a user interface library 136. The web servers 124, API servers 125, application servers 126, and database servers 128 can host cross-functional services 132. The application servers 126 can further host domain applications 134.

The cross-functional services 132 provide services to users and processes that utilize the enterprise application platform 112. For instance, the cross-functional services 132 can provide portal services (e.g., web services), database services and connectivity to the domain applications 134 for users that operate the client machine 116, the client/server machine 117 and the small device client machine 122. In addition, the cross-functional services 132 can provide an environment for delivering enhancements to existing applications and for integrating third-party and legacy applications with existing cross-functional services 132 and domain applications 134. Further, while the system 100 shown in FIG. 1 employs a client-server architecture, the embodiments of the present disclosure are of course not limited to such an architecture, and could equally well find application in a distributed, or peer-to-peer, architecture system.

The enterprise application platform 112 can provide an improved user interface that enables the effective and efficient use of different types of computer systems for different types of uses. The particular manner in which the enterprise application platform 112 provides the selectable options for configuring the computer system usage type for the new computer system improves the accuracy of the resulting configuration, thereby improving the functionality of the overall computer architecture in which the new computer system is implemented. Furthermore, the enterprise application platform 112 provides an accurate, efficient, and user-friendly way of configuring usage types for computer systems during their creation. As a result, users and components of a cloud computing system architecture can conveniently, quickly, and reliably determine for what use or purpose a computer system is dedicated. The enterprise application platform 112 is described in greater detail below in conjunction with FIGS. 2-6.

Figure 2:
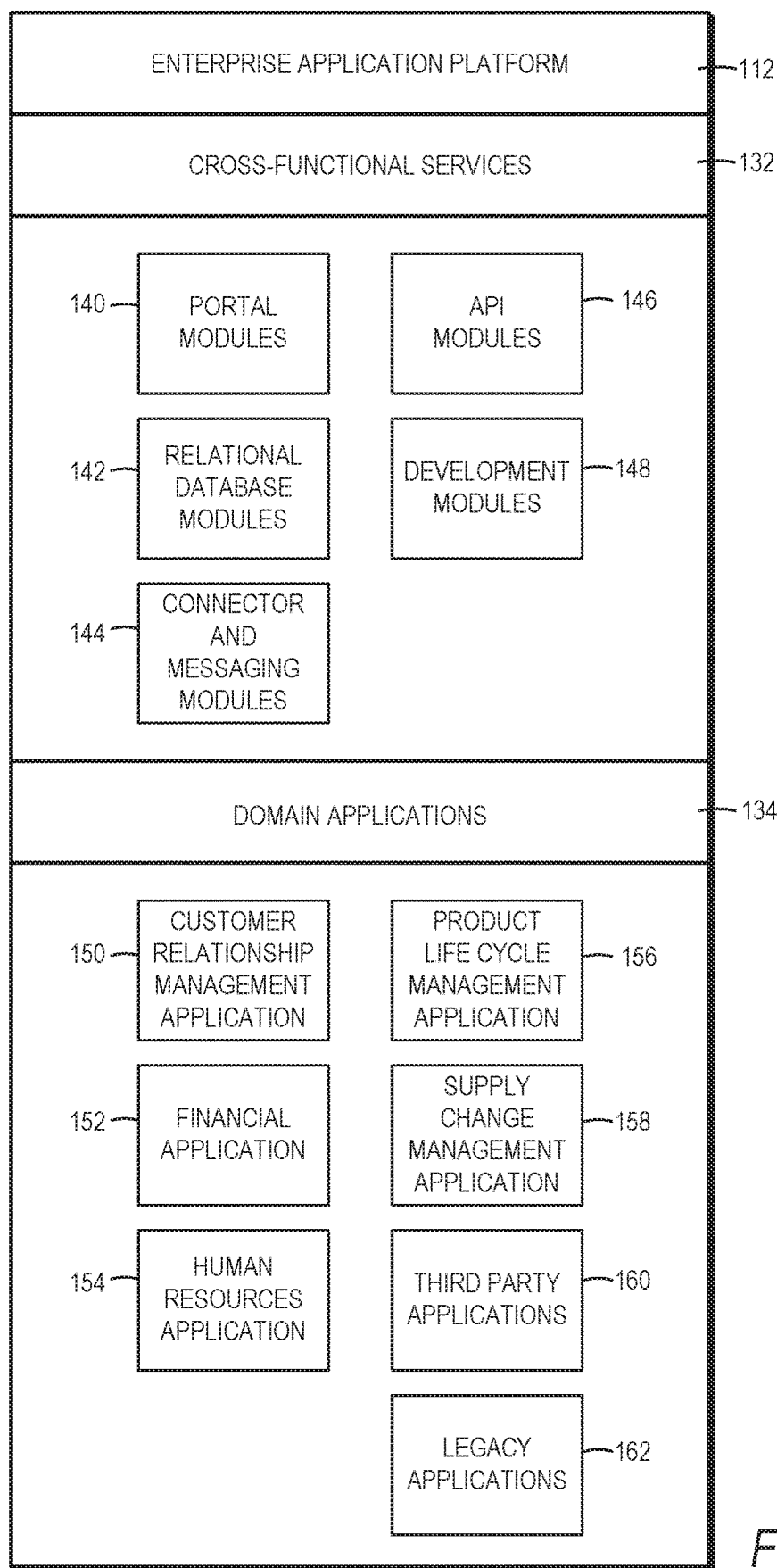
FIG. 2 is a block diagram illustrating enterprise applications and services in an enterprise application platform, in accordance with some example embodiments.

FIG. 2 is a block diagram illustrating enterprise applications and services in an enterprise application platform 112, in accordance with an example embodiment. The enterprise application platform 112 can include cross-functional services 132 and domain applications 134. The cross-functional services 132 can include portal modules 140, relational database modules 142, connector and messaging modules 144, API modules 146, and development modules 148.

The portal modules 140 can enable a single point of access to other cross-functional services 132 and domain applications 134 for the client machine 116, the small device client machine 122, and the client/server machine 117. The portal modules 140 can be utilized to process, author and maintain web pages that present content (e.g., user interface elements and navigational controls) to the user. In addition, the portal modules 140 can enable user roles, a construct that associates a role with a specialized environment that is utilized by a user to execute tasks, utilize services and exchange information with other users and within a defined scope. For example, the role can determine the content that is available to the user and the activities that the user can perform. The portal modules 140 include a generation module, a communication module, a receiving module and a regenerating module. In addition, the portal modules 140 can comply with web services standards and/or utilize a variety of Internet technologies including Java, J2EE, SAP's Advanced Business Application Programming Language (ABAP) and Web Dynpro, XML, JCA, JAAS, X.509, LDAP, WSDL, WSRR, SOAP, UDDI and Microsoft .NET.

The relational database modules 142 can provide support services for access to the database(s) 130, which includes a user interface library 136. The relational database modules 142 can provide support for object relational mapping, database independence and distributed computing. The relational database modules 142 can be utilized to add, delete, update and manage database elements. In addition, the relational database modules 142 can comply with database standards and/or utilize a variety of database technologies including SQL, SQLDBC, Oracle, MySQL, Unicode, JDBC, or the like.

The connector and messaging modules 144 can enable communication across different types of messaging systems that are utilized by the cross-functional services 132 and the domain applications 134 by providing a common messaging application processing interface. The connector and messaging modules 144 can enable asynchronous communication on the enterprise application platform 112.

The API modules 146 can enable the development of service-based applications by exposing an interface to existing and new applications as services. Repositories can be included in the platform as a central place to find available services when building applications.

The development modules 148 can provide a development environment for the addition, integration, updating and extension of software components on the enterprise application platform 112 without impacting existing cross-functional services 132 and domain applications 134.

Turning to the domain applications 134, the customer relationship management application 150 can enable access to and can facilitate collecting and storing of relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize the financial applications 152 and business processes to track and control financial transactions within the enterprise application platform 112. The financial applications 152 can facilitate the execution of operational, analytical and collaborative tasks that are associated with financial management. Specifically, the financial applications 152 can enable the performance of tasks related to financial accountability, planning, forecasting, and managing the cost of finance.

The human resource applications 154 can be utilized by enterprise personnel and business processes to manage, deploy, and track enterprise personnel. Specifically, the human resource applications 154 can enable the analysis of human resource issues and facilitate human resource decisions based on real time information.

The product life cycle management applications 156 can enable the management of a product throughout the life cycle of the product. For example, the product life cycle management applications 156 can enable collaborative engineering, custom product development, project management, asset management and quality management among business partners.

The supply chain management applications 158 can enable monitoring of performances that are observed in supply chains. The supply chain management applications 158 can facilitate adherence to production plans and on-time delivery of products and services.

The third-party applications 160, as well as legacy applications 162, can be integrated with domain applications 134 and utilize cross-functional services 132 on the enterprise application platform 112.

Figure 3:
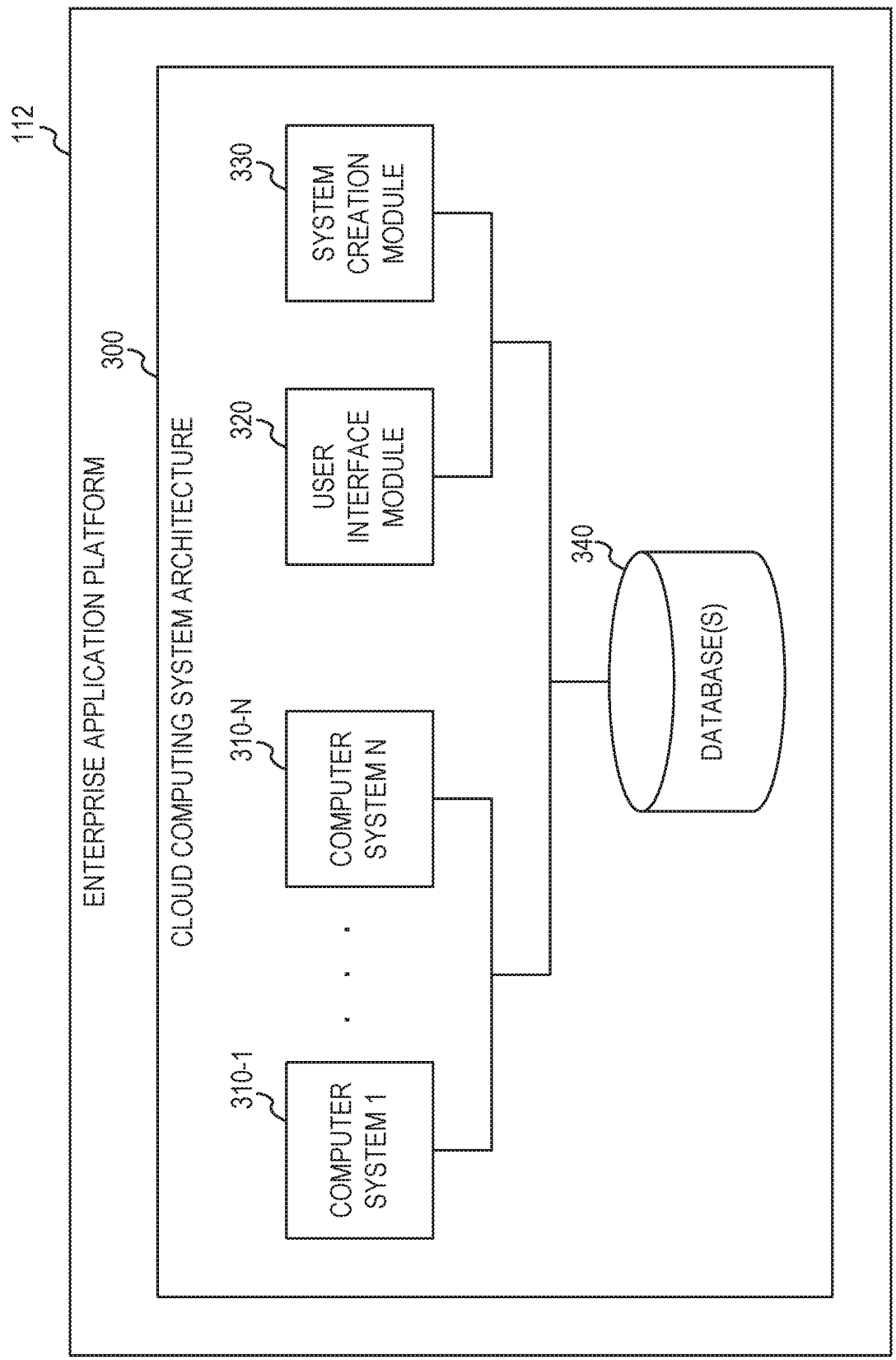
FIG. 3 is a block diagram illustrating a cloud computing system architecture in which a user interface for configuring a computer system usage type during creation of a new computer system is provided, in accordance with some example embodiments.

FIG. 3 is a block diagram illustrating a cloud computing system architecture 300 in which a user interface for configuring a computer system usage type during creation of a new computer system is provided, in accordance with some example embodiments. In some example embodiments, the cloud computing system architecture 300 is implemented by the enterprise application platform 112. However, the cloud computing system architecture 300 may be implemented in other ways as well.

In some example embodiments, the cloud computing system architecture 300 comprises any combination of one or more of a user interface module 320, a system creation module 320, and one or more databases 330. In some example embodiments, the cloud computing system architecture 300 resides on one or more machines each having a memory and at least one processor (not shown). In some example embodiments, the components of the cloud computing system architecture 300 reside on the same machine, while in other example embodiments, some of the different components of the cloud computing system architecture reside on separate remote machines that communicate with each other via a network (e.g., network 114 in FIG. 1). In some example embodiments, the cloud computing system architecture 300 is incorporated into the enterprise application platform 112 in FIG. 1 (e.g., on application server(s) 126). However, it is contemplated that other configurations are also within the scope of the present disclosure.

In some example embodiments, the cloud computing system architecture 300 comprises one or more computer systems 310 (e.g., computer system 310-1, . . . , computer system 310-N in FIG. 3). Each of these computer systems 310 may be created by a request from a computing device of a user of the cloud computing system architecture 300. In some example embodiments, the cloud computing system architecture 300 comprises a multi-tenancy architecture. Multi-tenancy refers to a software architecture in which a single instance of software runs on a server and serves multiple tenants. A tenant is a group of users who share a common access with specific privileges to the software instance. With a multi-tenancy architecture, a software application is designed to provide every tenant a dedicated share of the instance, including its data, configuration, user management, tenant individual functionality and non-functional properties. In some example embodiments, the cloud computing system architecture 300 comprises a multi-instance architecture in which separate software instances operate on behalf of different tenants, and each computer system 310 comprises a separate tenant. In some example embodiments, each computer system 310 comprises a separate environment in which a computer program or software component is deployed and executed, and access to each environment is restricted to a particular set of users.

Figure 4B:
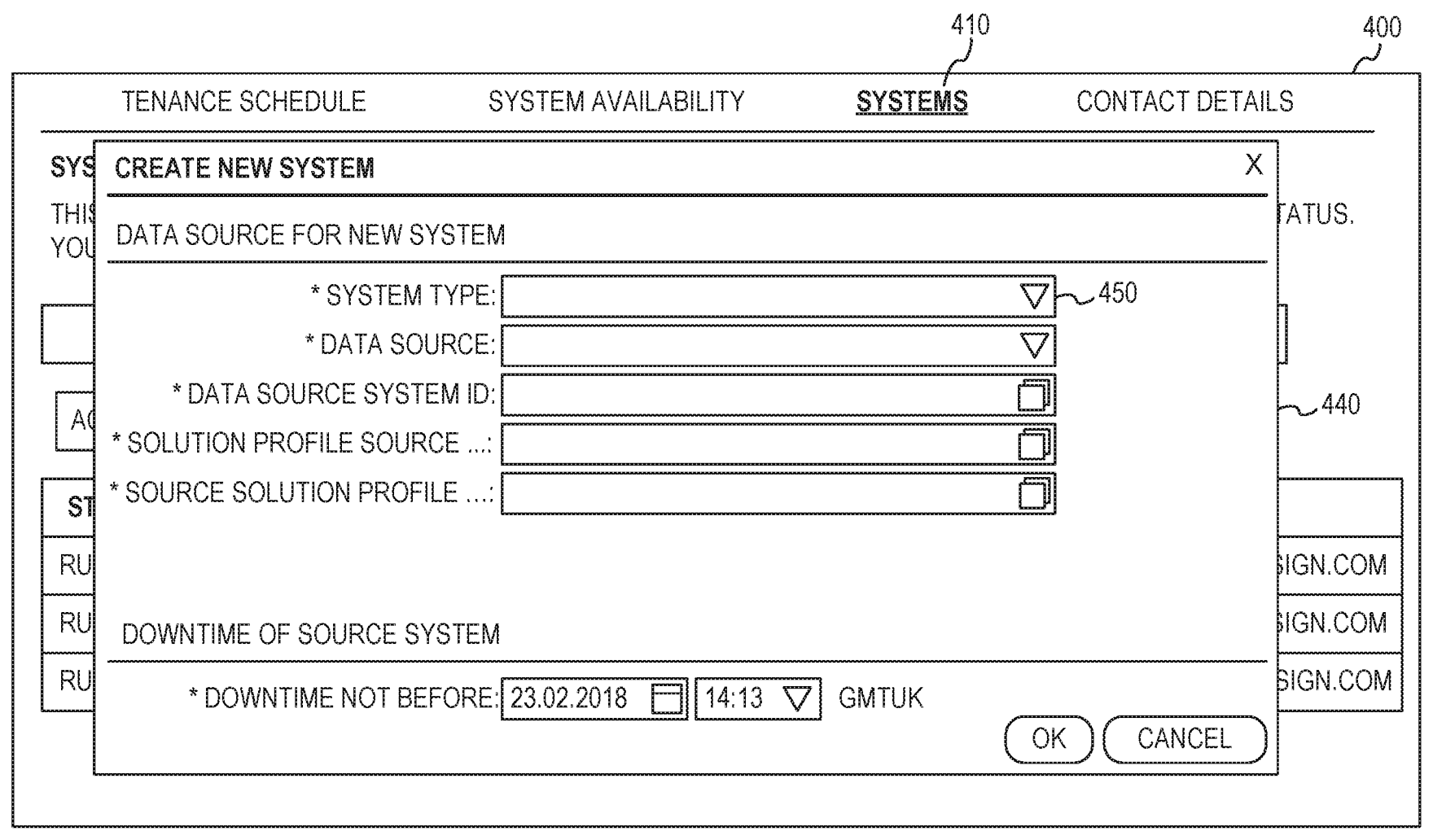
Figure 4C:
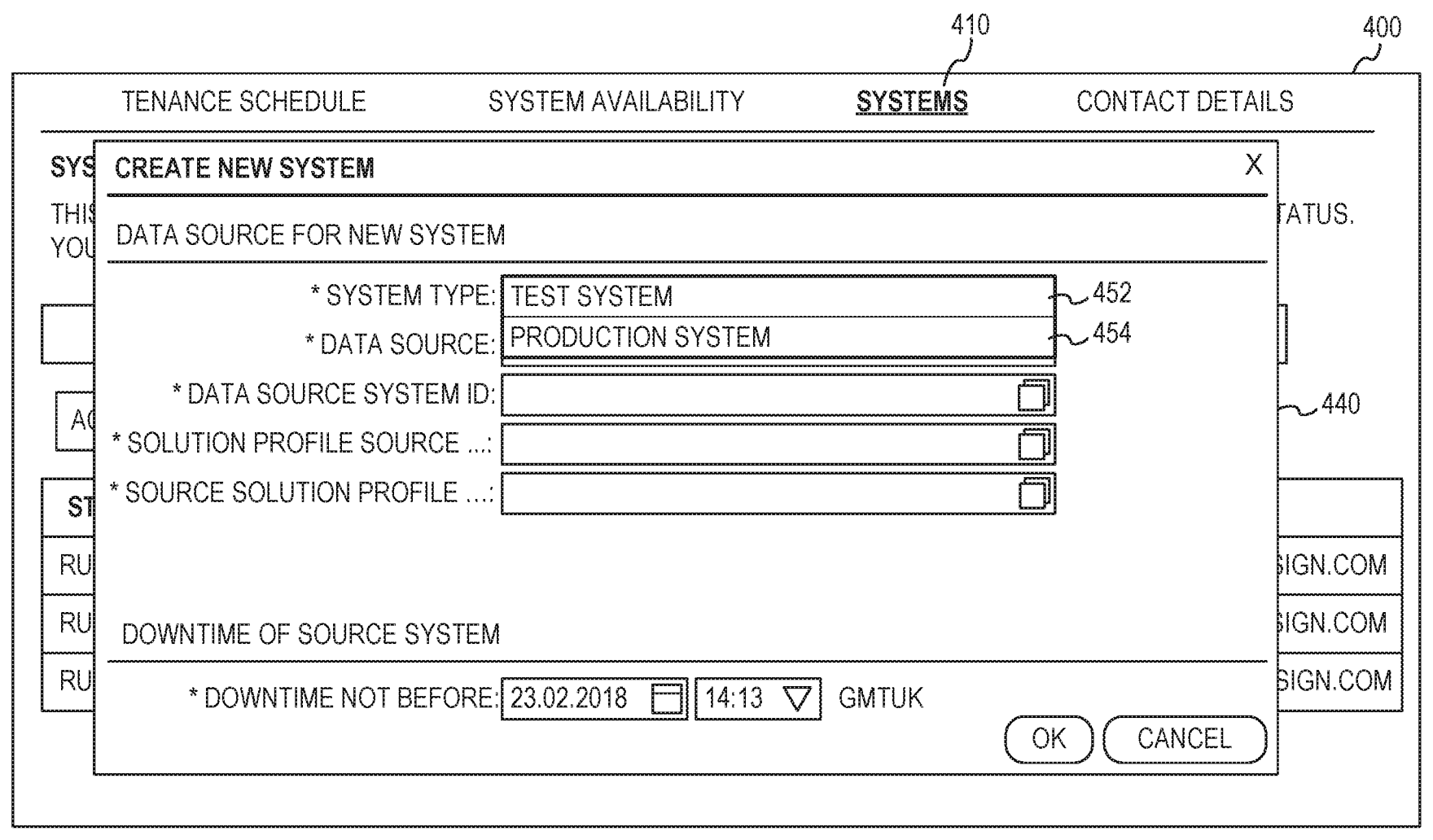
Figure 4D:
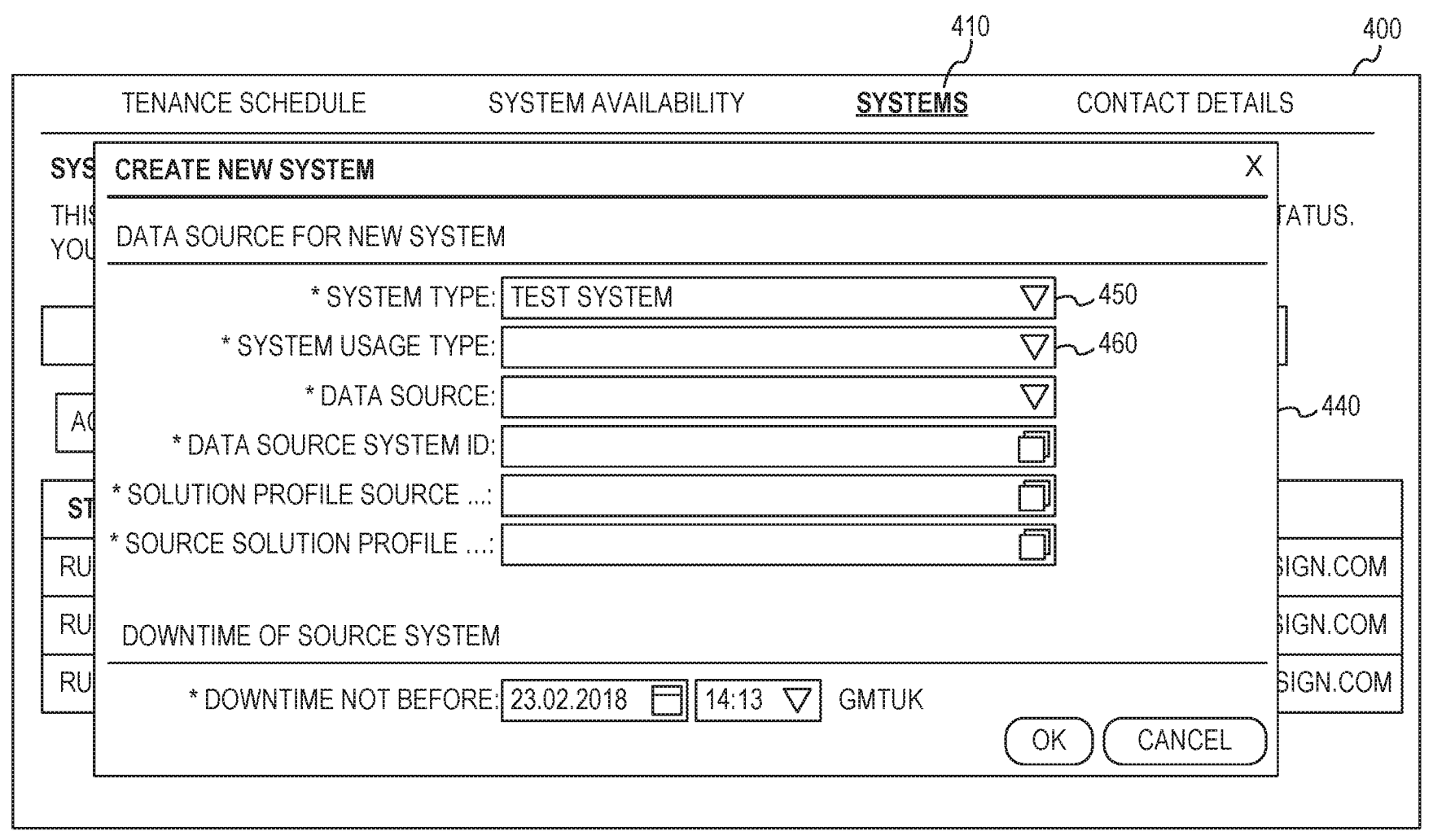
Figure 4E:
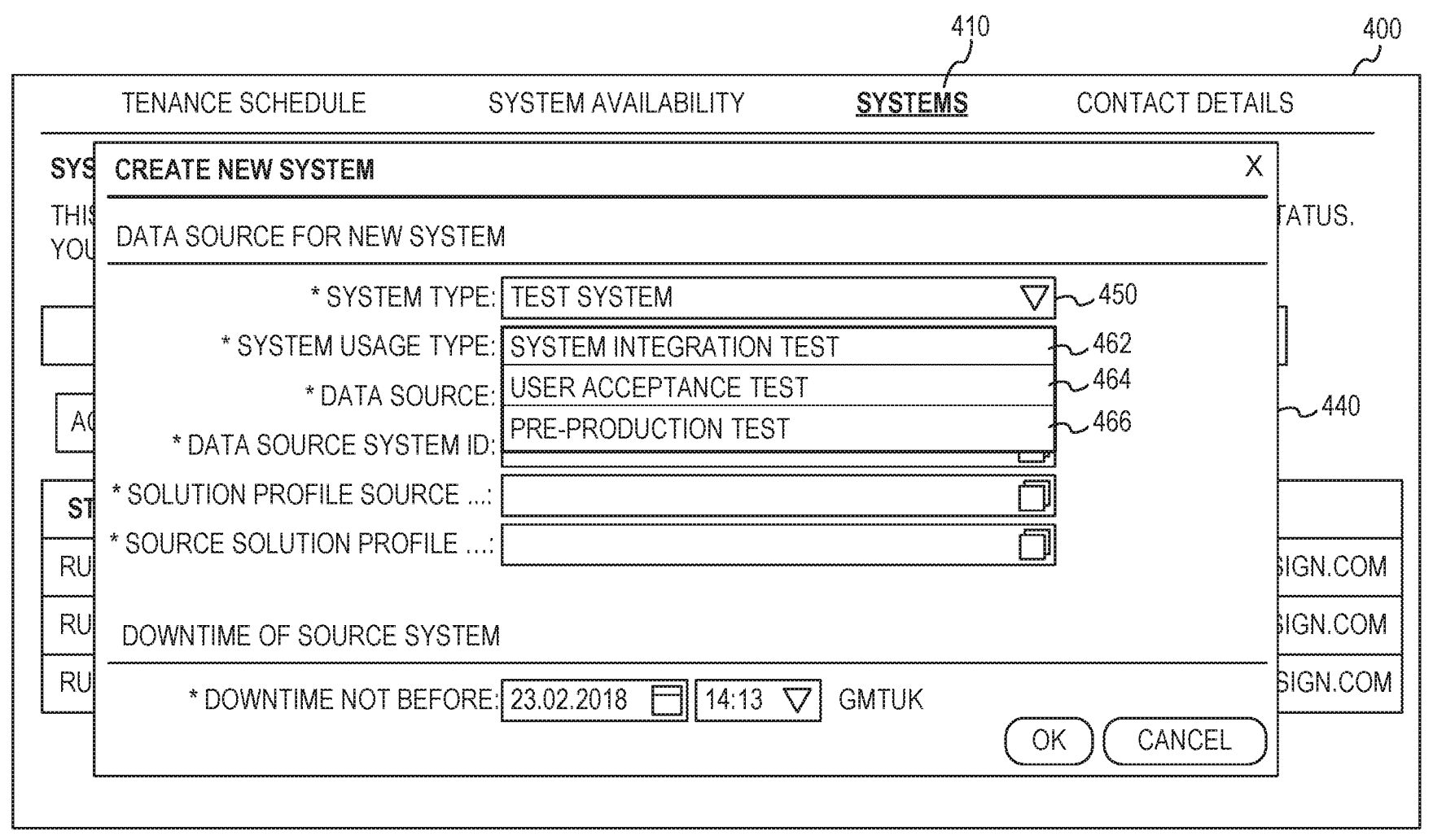
Figure 4F:
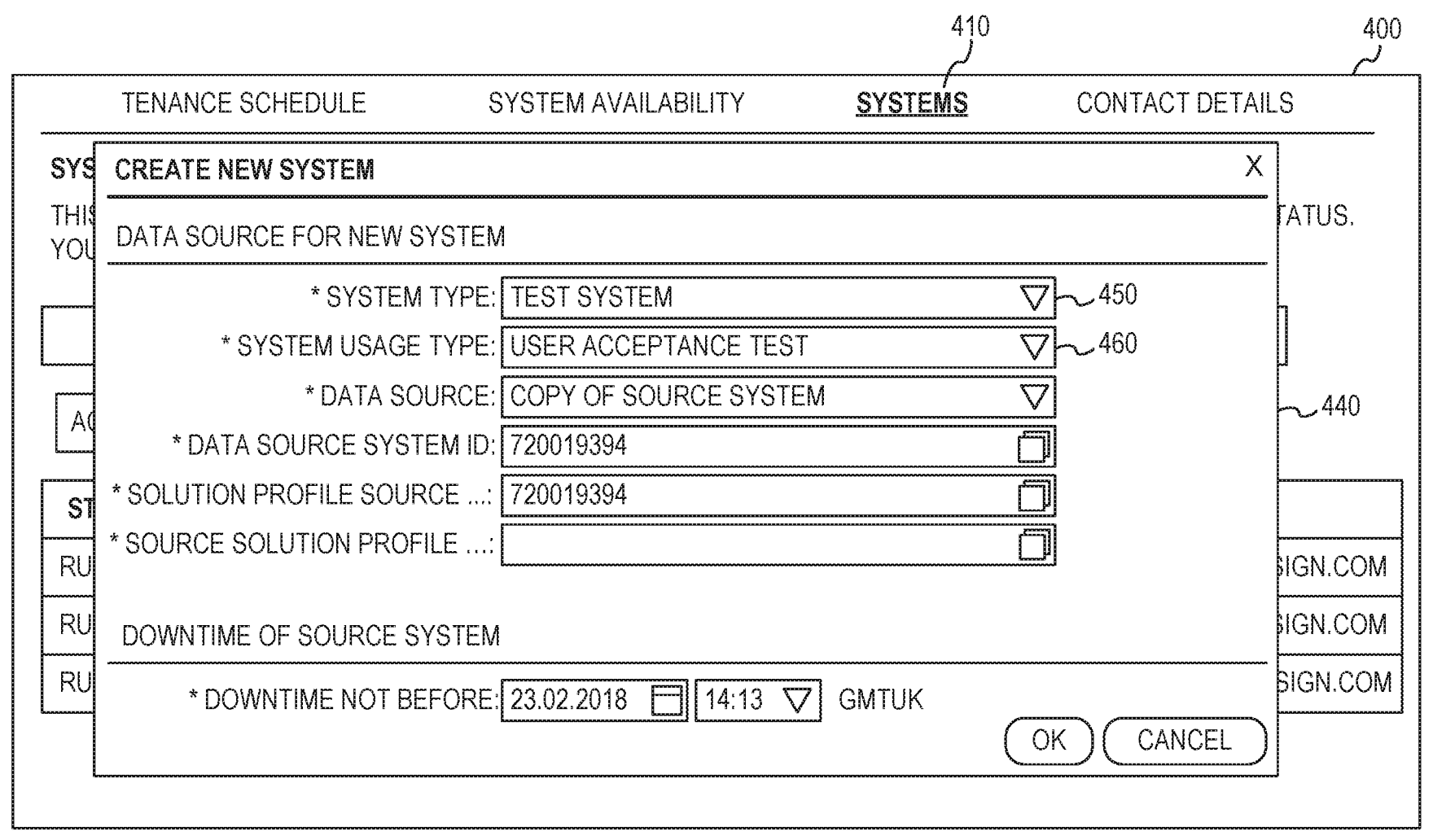
Figure 4G:
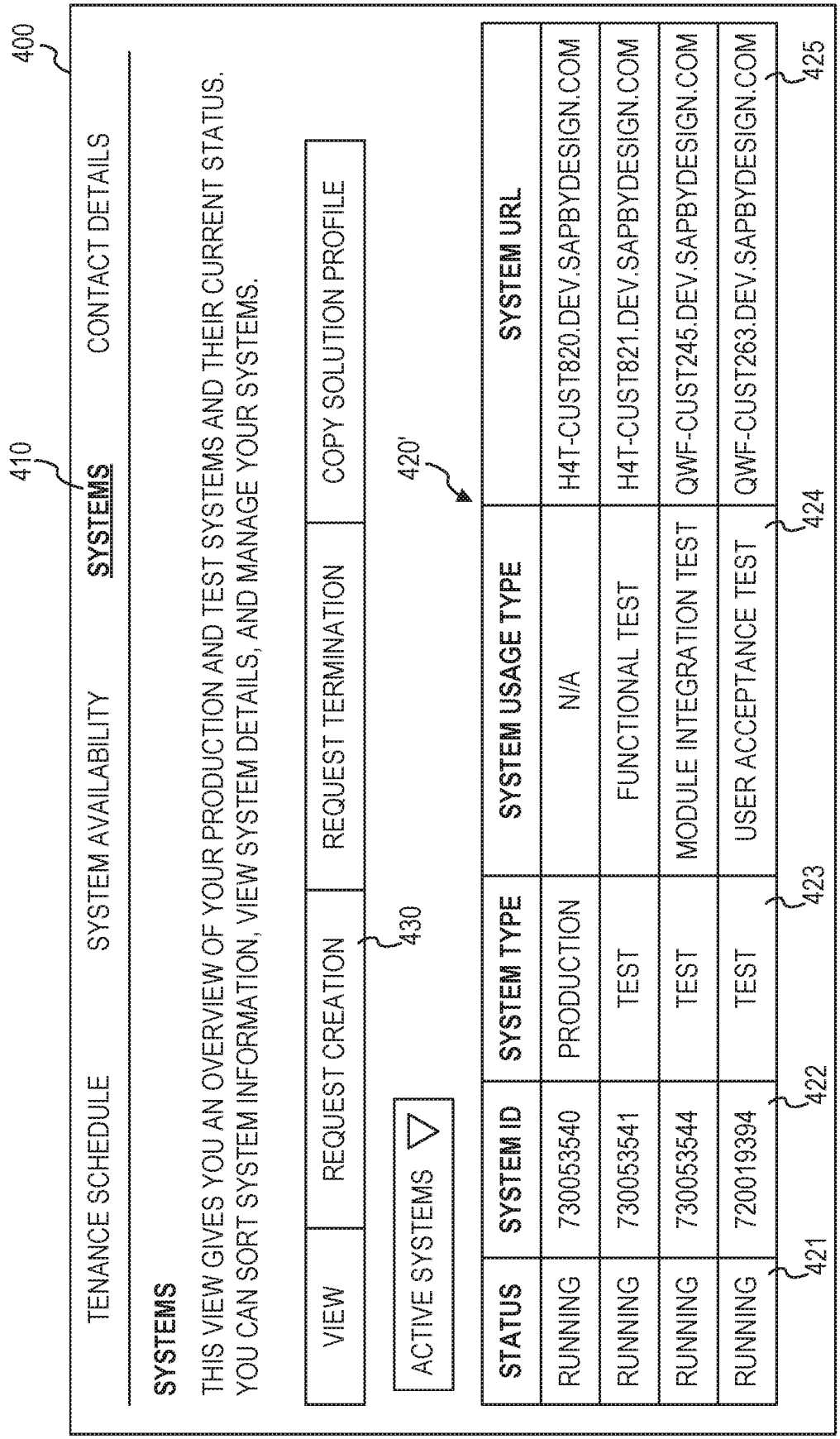

In some example embodiments, the user interface module 320 is configured to detect a request to create a new computer system 310 in the cloud computing system architecture 300. For example, a user of the cloud computing system architecture 300 may submit the request to create the new computer system 310 via a user interface of the cloud computing system architecture 300. FIGS. 4A-4G illustrate different stages of a user interface 400 in which a computer system usage type is configured during creation of a new computer system 310, in accordance with some example embodiments. In FIG. 4A, the user interface 400 displays a menu comprising selectable UI elements, including a selectable UI element 410 configured to, when selected, provide an overview of computer systems 310. In the example shown in FIG. 4A, the user has selected the selectable UI element 410, and, as a result, the user interface 400 displays a list 420 of the computer systems 310 in the cloud computing system architecture 300 or certain portion thereof (e.g., only those computer systems 310 to which the user has permission to view or access). In some example embodiments, the list 420 of computer systems 310 comprises corresponding information about each computer system 310, including, but not limited to, any combination of one or more of a status 421 of the computer system 310, a system ID 422 of the computer system 310, a system type 423 of the computer system 423, a system usage type 424 of the computer system 310, and a system URL 425 of the computer system 310. In some example embodiments, the user interface 400 displays a selectable UI element 430 configured to submit a request to create a new computer system 310 in response to, or otherwise based on, its selection by the user. The user interface module 320 detects this request to create a new computer system 310.

In some example embodiments, the user interface module 320 is configured to cause a first plurality of selectable user interface (UI) elements to be displayed on a computing device of the user that requested the creation of the new computer system 310 in response to, or otherwise based on, the detection of the request to create the new computer system 310. In FIG. 4B, the user has selected the selectable UI element 430 to create a new computer system 310, and the user interface module 320 has responded by causing the user interface 400 to display a pop-up window or panel 440 in which a selectable UI element 450 is displayed. In some example embodiments, as shown in FIG. 4C, the selectable UI element 450 is configured to, in response to being selected, display the first plurality of UI elements, with each one of the first plurality of selectable UI elements indicating a distinct system type. For example, in FIG. 4C, the first plurality of UI elements comprises a selectable UI element 452 indicating a "TEST" system type and a selectable UI element 454 indicating a "PRODUCTION" system type. In some example embodiments, the selectable UI element 450 comprises a drop-down menu. However, other types of selectable UI elements 450 configured to display the first plurality of selectable UI elements indicating distinct system types are also within the scope of the present disclosure, including, but not limited to, a scroll bar, selectable buttons, and selectable check boxes.

In some example embodiments, the user interface module 320 is configured to receive a first user selection of one of the first plurality of selectable UI elements from the computing device of the user, such as via the user clicking, tapping, or otherwise selecting one of the first plurality of selectable UI elements. Certain types of systems have multiple usage types, while other types of systems only have a single usage type. Therefore, the user interface module 320 selectively determines when to provide a second plurality of selectable UI elements for selection by the user by restricting such generation and presentation of the second plurality of selectable UI elements based on a determination that the system type selected by the user for the new computer system 310 comprises a predetermined system type. For example, in FIG. 4D, the user has selected the "TEST" system type in FIG. 4C, and, in response, the user interface module 320 determines that the selected system type is the same as the predetermined system type of "TEST" system. As a result of the user's selection matching the predetermined system type, the user interface module 320 causes the user interface 400 to display a second plurality of selectable UI elements in response to the determination, with each one of the second plurality of selectable UI elements indicating a distinct system usage type. However, if the user's selection of the system type for the new computer system 310 does not match a predetermined system type, then the user interface module 320 does not provide the second plurality of selectable UI elements indicating distinct system usage types for selection by the user.

In FIG. 4D, the user interface 400 displays a selectable UI element 460 configured to, in response to being selected, display the second plurality of UI elements. For example, in FIG. 4E, the user has selected the selectable UI element 460 in FIG. 4D, and, in response, the user interface module 320 has caused the user interface 400 to display the first plurality of UI elements, which comprise a selectable UI element 462 indicating a "SYSTEM INTEGRATION TEST" system usage type, and a selectable UI element 464 indicating a "USER ACCEPTANCE TEST" system usage type, and a selectable UI element 466 indicating a "PRE-PRODUCTION TEST" system usage type. In some example embodiments, the selectable UI element 460 comprises a drop-down menu. However, other types of selectable UI elements 460 configured to display the second plurality of selectable UI elements indicating distinct system usage types are also within the scope of the present disclosure, including, but not limited to, a scroll bar, selectable buttons, and selectable check boxes.

In some example embodiments, the user interface module 320 is configured to receive a user selection of one of the second plurality of UI elements from the computing device of the user, such as via the user clicking, tapping, or otherwise selecting one of the second plurality of selectable UI elements. In FIG. 4F, the user has selected the selectable UI element 464 indicating a "USER ACCEPTANCE TEST" system usage type in FIG. 4E. As a result of this user selection, the user interface 400 displays this selection in the selectable UI element 460 in FIG. 4F.

In some example embodiments, the user interface 400 displays other user interface elements that the user may interact with in order to select or enter other data for the creation of the new computer system 310. For example, the user interface 400 may display user interface elements configured to enable the user to specify a source of data to be used for the new computer system 310, a system identification of the source of data, and a system identification of a software solution to be used in the new computer system 310. The user interface 400 may enable the user to specify other information for the creation of the new computer system 310 as well.

In some example embodiments, the system creation module 330 is configured to receive a confirmation instruction from the user to create and configure the new computer system 310 using the specifications configured by the user using the user interface 400, such as the system type and the system usage type. The user may submit the instruction using a selectable UI element, such as a selectable "OK" or "SUBMIT" button. In some example embodiments, the system creation module 330 is configured to create the new computer system in the computer architecture using the specifications configured by the user via the user interface 400. The creation of the new computer system 310 may comprise creating a new tenant or a new environment in the cloud computing system architecture 300 or deploying a new instance of a software solution. In some example embodiments, the system creation module 330 stores the distinct system usage type indicated by the user's selection of the second plurality of UI elements in association with the new computer system 310 in the database 340.

In some example embodiments, the user interface module 320 is configured to receive a request from the computing device of the user, or from the computing device of another user, to view the list of computer systems 310 in the computer architecture. In some example embodiments, the user interface module 320 is configured to retrieve the distinct system usage type stored in association with the new computer system 310 from the database 340, and cause the list of computer systems in the computer architecture to be displayed on the computing device, with the retrieved distinct system usage type being displayed in association with the new computer system 310 in the list of computer systems. In FIG. 4G, the user interface 400 displays an updated list 420' of the computer systems 310 including the newly created computer system 310 and its corresponding system type and system usage type.

Figure 5:
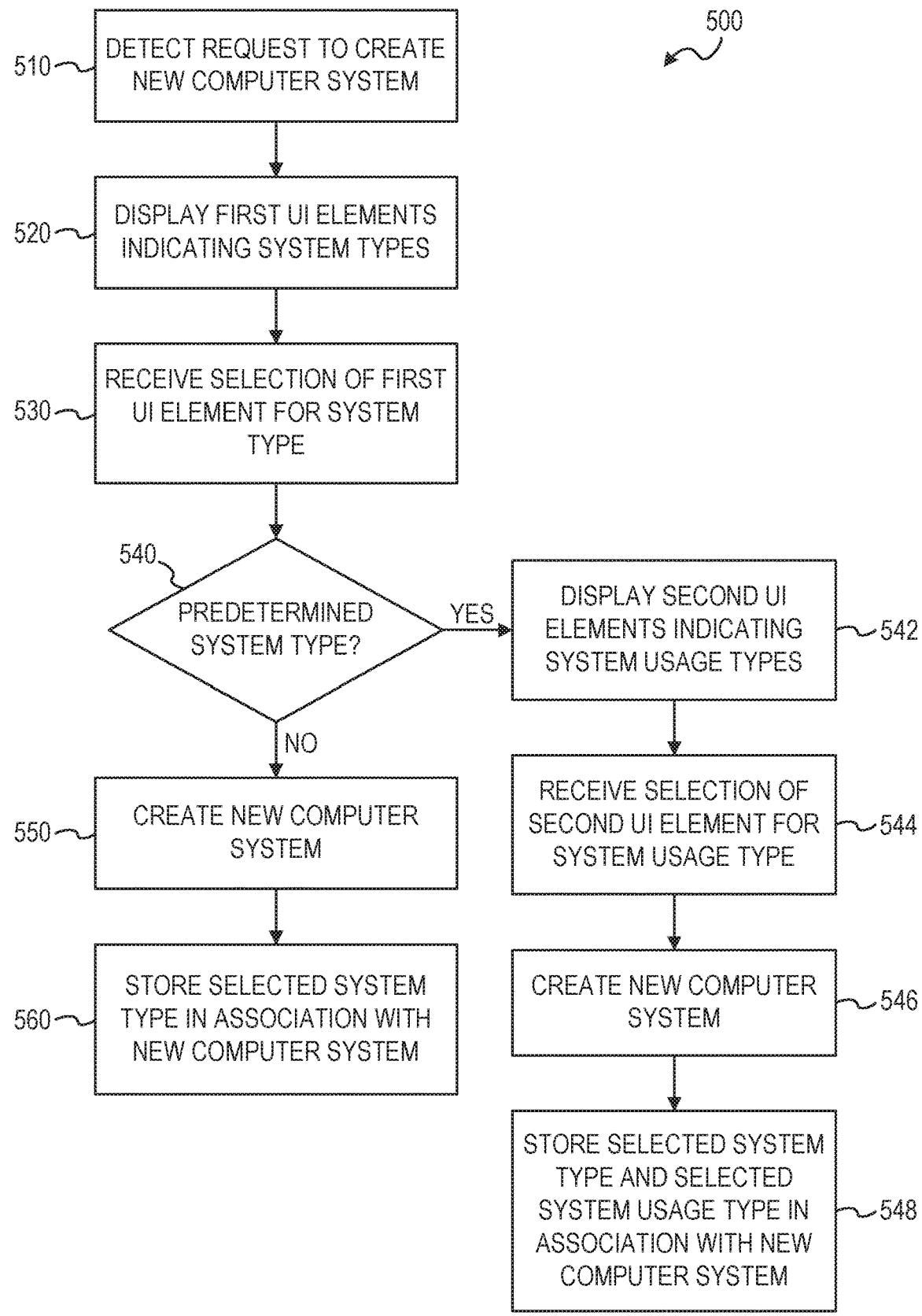
FIG. 5 illustrates a flowchart illustrating a method of providing a user interface for configuring a computer system usage type during creation of a new computer system, in accordance with some example embodiments.

FIG. 5 illustrates a flowchart illustrating a method 500 of providing a user interface for configuring a computer system usage type during creation of a new computer system, in accordance with some example embodiments. Method 500 can be performed by processing logic that can comprise hardware (e.g., circuitry, dedicated logic, programmable logic, microcode, etc.), software (e.g., instructions run on a processing device), or a combination thereof. In one example embodiment, the method 500 is performed by the enterprise application platform 112 of FIGS. 2-3 or any combination of one or more of its components (e.g., the user interface module 320, the system creation module 330), as described above.

At operation 510, the enterprise application platform 112 detects a request to create a new computer system in a cloud computing system architecture. At operation 520, the enterprise application platform 112 causes a first plurality of selectable UI elements to be displayed on a first computing device based on the detecting of the request, with each one of the first plurality of selectable UI elements indicating a distinct system type. In some example embodiments, the first plurality of selectable UI elements comprises a first selectable UI element indicating a production system and second selectable UI element indicating a test system. However, other system types may also be used. In some example embodiments, the first plurality of selectable UI elements is displayed on the first computing device using at least one of a drop-down menu, a scroll bar, selectable buttons, and selectable check boxes. However, other ways of displaying the first plurality of selectable UI elements may also be used. At operation 530, the enterprise application platform 112 receives a first user selection of one of the first plurality of selectable UI elements from the first computing device.

At operation 540, the enterprise application platform 112 determines whether or not the distinct system type indicated by the first user selection of the selected one of the first plurality of selectable UI elements comprises a predetermined system type. In some example embodiments, the predetermined system type comprises a test system for testing one or more aspects of a cloud software solution. However, one or more other system types may be used as the predetermined system type.

If, at operation 540, the enterprise application platform 112 determines that the distinct system type indicated by the first user selection of the selected one of the first plurality of selectable UI elements does not comprise the predetermined system type, then enterprise application platform 112 creates the new computer system at operation 550, and then stores the selected system type in association with the new computer system in a database.

If, at operation 540, the enterprise application platform 112 determines that the distinct system type indicated by the first user selection of the selected one of the first plurality of selectable UI elements does comprise the predetermined system type, then the enterprise application platform 112 causes a second plurality of selectable UI elements to be displayed on the first computing device, at operation 542, in response to the determination, with each one of the second plurality of selectable UI elements indicating a distinct system usage type. In some example embodiments, the distinct system usage types of the second plurality of selectable UI elements comprise different types of tests. In some example embodiments, the different types of tests comprise at least one of a functional test, a module integration test, a system integration test, and a user acceptance test. However, other types of system usage types may be used. In some example embodiments, the second plurality of selectable UI elements are displayed on the first computing device using at least one of a drop-down menu, a scroll bar, selectable buttons, and selectable check boxes. However, other ways of displaying the second plurality of selectable UI elements may also be used.

At operation 544, the enterprise application platform 112 receives a second user selection of one of the second plurality of UI elements from the first computing device. At operation 546, the enterprise application platform 112 creates the new computer system in the computer architecture. At operation 548, the enterprise application platform 112 stores the selected system type and the distinct system usage type indicated by the selected one of the second plurality of UI elements in association with the new computer system in the database.

It is contemplated that any of the other features described within the present disclosure can be incorporated into method 500.

Figure 6:
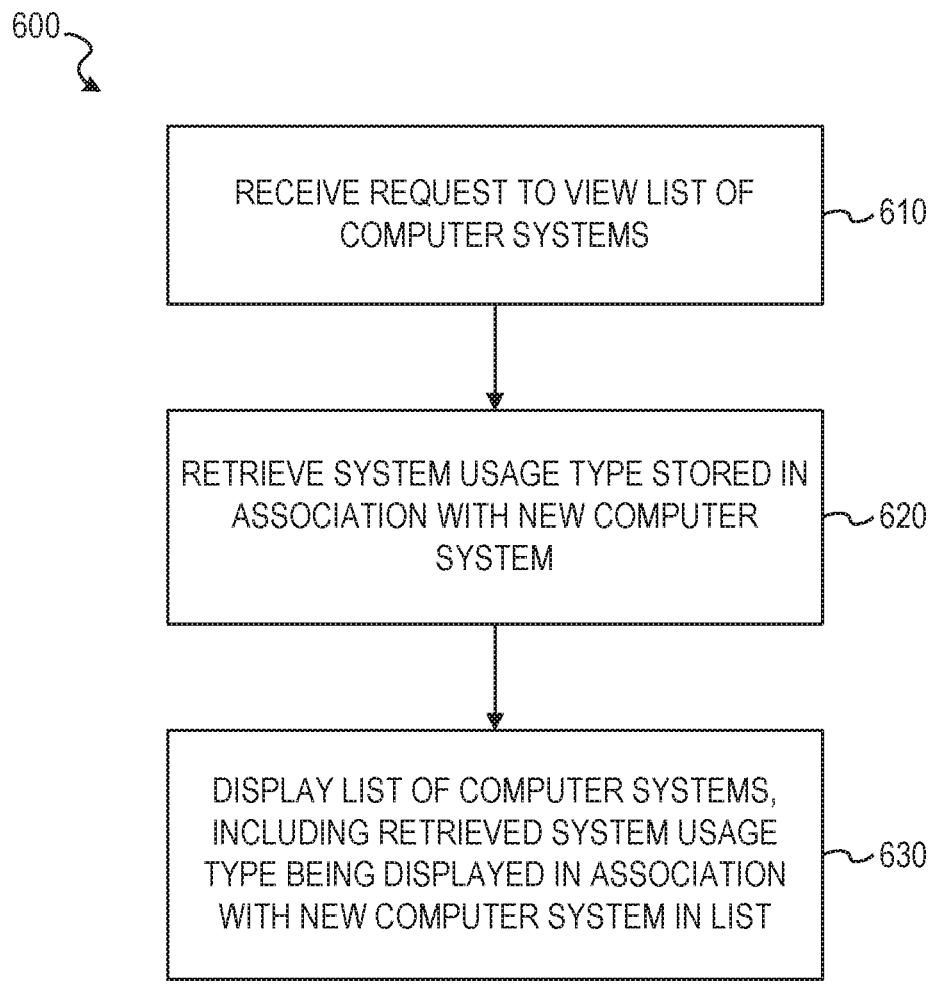
FIG. 6 is a flowchart illustrating a method of using a computer system usage type configured during creation of a new computer system, in accordance with some example embodiments.

FIG. 6 is a flowchart illustrating a method 600 of using a computer system usage type configured during creation of a new computer system, in accordance with some example embodiments. Method 600 can be performed by processing logic that can comprise hardware (e.g., circuitry, dedicated logic, programmable logic, microcode, etc.), software (e.g., instructions run on a processing device), or a combination thereof. In one example embodiment, the method 600 is performed by the enterprise application platform 112 of FIGS. 2-3 or any combination of one or more of its components (e.g., the user interface module 320, the system creation module 330), as described above.

At operation 610, the enterprise application platform 112 receives a request from a second computing device to view a list of computer systems in the computer architecture. At operation 620, the enterprise application platform 112 retrieves the distinct system usage type stored in association with the new computer system from the database. At operation 630, the enterprise application platform 112 causes the list of computer systems in the computer architecture to be displayed on the second computing device, the retrieved distinct system usage type being displayed in association with the new computer system in the list of computer systems.

It is contemplated that any of the other features described within the present disclosure can be incorporated into method 600.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 7:
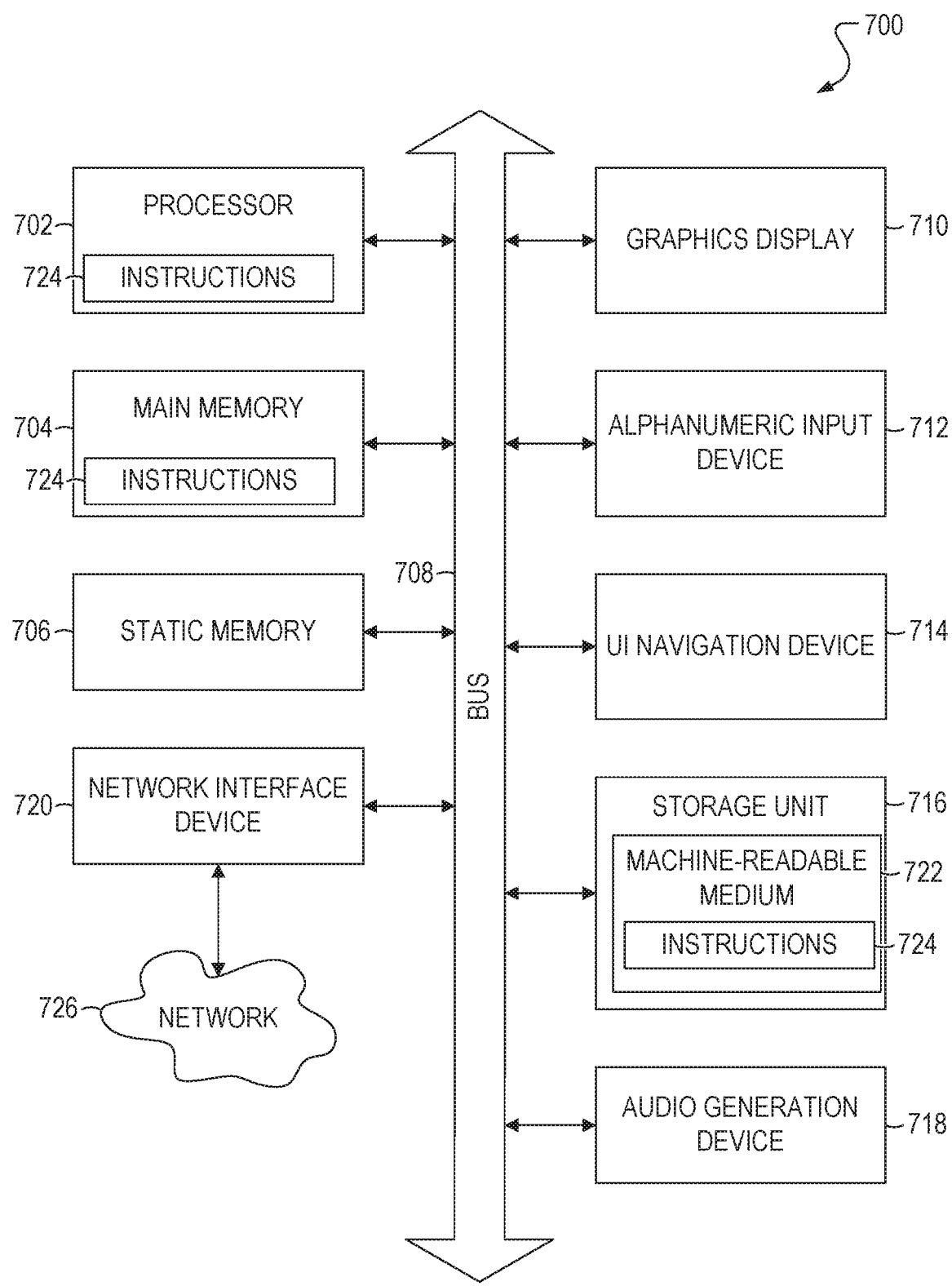
FIG. 7 is a block diagram of an example computer system on which methodologies described herein can be executed, in accordance with some example embodiments.

FIG. 7 is a block diagram of a machine in the example form of a computer system 700 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a graphics or video display unit 710 (e.g., a liquid crystal display (LCD) or a cathode ray tube (CRT)). The computer system 700 also includes an alphanumeric input device 712 (e.g., a keyboard), a user interface (UI) navigation (or cursor control) device 714 (e.g., a mouse), a storage unit (e.g., a disk drive unit) 716, an audio or signal generation device 718 (e.g., a speaker), and a network interface device 720.

The storage unit 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media. The instructions 724 may also reside, completely or at least partially, within the static memory 706.

While the machine-readable medium 722 is shown in an example embodiment to be a single medium, the term "machine-readable medium" may include a single medium or multiple media (e.g., a centralized or distributed database, and/or associated caches and servers) that store the one or more instructions 724 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

The following numbered examples are embodiments.

1. A computer-implemented method comprising:
    detecting, by at least one hardware processor, a request to create a new computer system in a cloud computing system architecture;
    causing, by the at least one hardware processor, a first plurality of selectable user interface (UI) elements to be displayed on a first computing device based on the detecting of the request, each one of the first plurality of selectable UI elements indicating a distinct system type;
    receiving, by the at least one hardware processor, a first user selection of one of the first plurality of selectable UI elements from the first computing device;
    determining, by the at least one hardware processor, that the distinct system type indicated by the first user selection of the selected one of the first plurality of selectable UI elements comprises a predetermined system type;
    causing, by the at least one hardware processor, a second plurality of selectable UI elements to be displayed on the first computing device in response to the determination, each one of the second plurality of selectable UI elements indicating a distinct system usage type;
    receiving, by the at least one hardware processor, a second user selection of one of the second plurality of UI elements from the first computing device;
    creating, by the at least one hardware processor, the new computer system in the computer architecture; and
    storing, by the at least one hardware processor, the distinct system usage type indicated by the selected one of the second plurality of UI elements in association with the new computer system in a database.

2. The computer-implemented method of example 1, further comprising:
    receiving, by the at least one hardware processor, a request from a second computing device to view a list of computer systems in the computer architecture;
    retrieving, by the at least one hardware processor, the distinct system usage type stored in association with the new computer system from the database; and
    causing, by the at least one hardware processor, the list of computer systems in the computer architecture to be displayed on the second computing device, the retrieved distinct system usage type being displayed in association with the new computer system in the list of computer systems.

3. The computer-implemented method of example 1 or example 2, wherein the predetermined system type comprises a test system for testing one or more aspects of a cloud software solution.

4. The computer-implemented method of any one of examples 1 to 3, wherein the distinct system usage types of the second plurality of selectable UI elements comprise different types of tests.

5. The computer-implemented method of any one of examples 1 to 4, wherein the different types of tests comprise at least one of a functional test, a module integration test, a system integration test, and a user acceptance test.

6. The computer-implemented method of any one of examples 1 to 5, wherein the first plurality of selectable UI elements comprises a first selectable UI element indicating a production system and second selectable UI element indicating a test system.

7. The computer-implemented method of any one of examples 1 to 6, wherein the second plurality of selectable UI elements are displayed on the first computing device using at least one of a drop-down menu, a scroll bar, selectable buttons, and selectable check boxes.

8. A system comprising:
   at least one processor; and
   a non-transitory computer-readable medium storing executable instructions that, when executed, cause the at least one processor to perform the method of any one of examples 1 to 7.
9. A non-transitory machine-readable storage medium, tangibly embodying a set of instructions that, when executed by at least one processor, causes the at least one processor to perform the method of any one of examples 1 to 7.
10. A machine-readable medium carrying a set of instructions that, when executed by at least one processor, causes the at least one processor to carry out the method of any one of examples 1 to 7.

Each of the features and teachings disclosed herein can be utilized separately or in conjunction with other features and teachings to provide a system and method for providing a user interface for configuring a computer system usage type during creation of a new computer system in a computer architecture. Representative examples utilizing many of these additional features and teachings, both separately and in combination, are described in further detail with reference to the attached figures. This detailed description is merely intended to teach a person of skill in the art further details for practicing preferred aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The example methods or algorithms presented herein are not inherently related to any particular computer or other apparatus. Various general purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method comprising:
   detecting, by at least one hardware processor, a request to create a new computer system in a cloud computing system architecture;
   causing, by the at least one hardware processor, a first plurality of selectable user interface (UI) elements to be displayed on a first computing device based on the detecting of the request, each one of the first plurality of selectable UI elements indicating a distinct system type;
   receiving, by the at least one hardware processor, a first user selection of one of the first plurality of selectable UI elements from the first computing device;
   determining, by the at least one hardware processor, that the distinct system type indicated by the first user selection of the selected one of the first plurality of selectable UI elements comprises a predetermined system type;
   causing, by the at least one hardware processor, a second plurality of selectable UI elements to be displayed on the first computing device in response to the determination, each one of the second plurality of selectable UI elements indicating a distinct system usage type, the distinct system usage types of the second plurality of selectable UI elements comprising different types of tests;
   receiving, by the at least one hardware processor, a second user selection of one of the second plurality of UI elements from the first computing device;
   creating, by the at least one hardware processor, the new computer system in the computer architecture; and
   storing, by the at least one hardware processor, the distinct system usage type indicated by the selected one of the second plurality of UI elements in association with the new computer system in a database.

2. The computer-implemented method of claim 1, wherein the predetermined system type comprises a test system for testing one or more aspects of a cloud software solution.

3. The computer-implemented method of claim 1, wherein the different types of tests comprise a functional test, a module integration test, a system integration test, and a user acceptance test.

4. The computer-implemented method of claim 1, wherein the first plurality of selectable UI elements comprises a first selectable UI element indicating a production system and second selectable UI element indicating a test system.

5. The computer-implemented method of claim 1, wherein the second plurality of selectable UI elements are displayed on the first computing device using at least one of a drop-down menu, a scroll bar, selectable buttons, and selectable check boxes.

6. The computer-implemented method of claim 1, wherein the causing the list of computer systems in the computer architecture to be displayed on the second computing device comprises causing a corresponding system usage type for each computer system in the list of computer systems to be displayed in association with the computer system in the list of computer systems.

7. The computer-implemented method of claim 1, further comprising:
   receiving, by the at least one hardware processor, a request from a second computing device to view a list of computer systems in the computer architecture;
   retrieving, by the at least one hardware processor, the distinct system usage type stored in association with the new computer system from the database; and
   causing, by the at least one hardware processor, the list of computer systems in the computer architecture to be displayed on the second computing device, the retrieved distinct system usage type being displayed in association with the new computer system in the list of computer systems.

8. A system comprising:
   at least one processor; and
   a non-transitory computer-readable medium storing executable instructions that, when executed, cause the at least one processor to perform operations comprising:
      detecting a request to create a new computer system in a computer architecture;
      causing a first plurality of selectable user interface (UI) elements to be displayed on a first computing device based on the detecting of the request, each one of the first plurality of selectable UI elements indicating a distinct system type;
      receiving a first user selection of one of the first plurality of selectable UI elements from the first computing device;
      determining that the distinct system type indicated by the first user selection of the selected one of the first plurality of selectable UI elements comprises a predetermined system type;
      causing a second plurality of selectable UI elements to be displayed on the first computing device in response to the determination, each one of the second plurality of selectable UI elements indicating a distinct system usage type, the distinct system usage types of the second plurality of selectable UI elements comprising different types of tests;
      receiving a second user selection of one of the second plurality of UI elements from the first computing device;
      creating the new computer system in the computer architecture;
      storing the distinct system usage type indicated by the selected one of the second plurality of UI elements in association with the new computer system in a database.

9. The system of claim 8, wherein the predetermined system type comprises a test system for testing one or more aspects of a cloud software solution.

10. The system of claim 8, wherein the different types of tests comprise a functional test, a module integration test, a system integration test, and a user acceptance test.

11. The system of claim 8, wherein the first plurality of selectable UI elements comprises a first selectable UI element indicating a production system and second selectable UI element indicating a test system.

12. The system of claim 8, wherein the second plurality of selectable UI elements are displayed on the first computing device using at least one of a drop-down menu, a scroll bar, selectable buttons, and selectable check boxes.

13. The system of claim 8, wherein the causing the list of computer systems in the computer architecture to be displayed on the second computing device comprises causing a corresponding system usage type for each computer system in the list of computer systems to be displayed in association with the computer system in the list of computer systems.

14. The system of claim 8, wherein the operations further comprise:
   receiving a request from a second computing device to view a list of computer systems in the computer architecture;
   retrieving the distinct system usage type stored in association with the new computer system from the database; and
   causing the list of computer systems in the computer architecture to be displayed on the second computing device, the retrieved distinct system usage type being displayed in association with the new computer system in the list of computer systems.

15. A non-transitory machine-readable storage medium, tangibly embodying a set of instructions that, when executed by at least one processor, causes the at least one processor to perform operations comprising:
   detecting a request to create a new computer system in a computer architecture;
   causing a first plurality of selectable user interface (UI) elements to be displayed on a first computing device based on the detecting of the request, each one of the first plurality of selectable UI elements indicating a distinct system type;
   receiving a first user selection of one of the first plurality of selectable UI elements from the first computing device;
   determining that the distinct system type indicated by the first user selection of the selected one of the first plurality of selectable UI elements comprises a predetermined system type;
   causing a second plurality of selectable UI elements to be displayed on the first computing device in response to the determination, each one of the second plurality of selectable UI elements indicating a distinct system usage type, the distinct system usage types of the second plurality of selectable UI elements comprising different types of tests;
   receiving a second user selection of one of the second plurality of UI elements from the first computing device;
   creating the new computer system in the computer architecture;
   storing the distinct system usage type indicated by the selected one of the second plurality of UI elements in association with the new computer system in a database.

16. The non-transitory machine-readable storage medium of claim 15, wherein the predetermined system type comprises a test system for testing one or more aspects of a cloud software solution.

17. The non-transitory machine-readable storage medium of claim 15, wherein the different types of tests comprise a functional test, a module integration test, a system integration test, and a user acceptance test.

18. The non-transitory machine-readable storage medium of claim 15, wherein the first plurality of selectable UI elements comprises a first selectable UI element indicating a production system and second selectable UI element indicating a test system.

19. The non-transitory machine-readable storage medium of claim 15, wherein the causing the list of computer systems in the computer architecture to be displayed on the second computing device comprises causing a corresponding system usage type for each computer system in the list of computer systems to be displayed in association with the computer system in the list of computer systems.

20. The non-transitory machine-readable storage medium of claim 15; wherein the operations further comprise:
   receiving a request from a second computing device to view a list of computer systems in the computer architecture;
   retrieving the distinct system usage type stored in association with the new computer system from the database; and
   causing the list of computer systems in the computer architecture to be displayed on the second computing device, the retrieved distinct system usage type being displayed in association with the new computer system in the list of computer systems.

* * * * *